US012568192B2

(12) United States Patent
Nishio

(10) Patent No.: US 12,568,192 B2
(45) Date of Patent: Mar. 3, 2026

(54) IMAGE PROCESSING APPARATUS, METHOD, AND STORAGE MEDIUM

(71) Applicant: CANON KABUSHIKI KAISHA, Tokyo (JP)

(72) Inventor: Taisuke Nishio, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 139 days.

(21) Appl. No.: 18/182,281

(22) Filed: Mar. 10, 2023

(65) Prior Publication Data

US 2023/0300307 A1     Sep. 21, 2023

(30) Foreign Application Priority Data

Mar. 17, 2022     (JP) ................................. 2022-042912

(51) Int. Cl.
H04N 9/73 (2023.01)
G06V 10/56 (2022.01)

(52) U.S. Cl.
CPC .............. H04N 9/73 (2013.01); G06V 10/56 (2022.01)

(58) Field of Classification Search
CPC .......... H04N 9/73; H04N 23/71; H04N 23/72; G06V 10/56
See application file for complete search history.

(56) References Cited

U.S. PATENT DOCUMENTS

2016/0286112 A1* 9/2016 Uemura ................ H04N 23/71

FOREIGN PATENT DOCUMENTS

| JP | 2006314616 A | * 11/2006 | ........ A61B 1/00057 |
| JP | 2007208884 A | 8/2007 | |
| JP | 4239738 B2 | * 3/2009 | ............ H04N 5/225 |
| JP | 2016187121 A | 10/2016 | |

* cited by examiner

*Primary Examiner* — Nhan T Tran
(74) *Attorney, Agent, or Firm* — Canon U.S.A., Inc. IP Division

(57)     ABSTRACT

An image processing apparatus includes at least one processor, and a memory coupled to the at least one processor storing instructions that, when executed by the processor, cause the processor to function as a detection unit configured to detect deviation in black balance in an input image, an acquisition unit configured to acquire information on white balance of the input image, a calculation unit configured to calculate, in a case where the detection unit detects deviation in the black balance, a correction value to correct the deviation in the black balance based on the information on the white balance, and a correction unit configured to correct the deviation in the black balance based on the correction value calculated by the calculation unit.

15 Claims, 18 Drawing Sheets

FIG.2

| OFFSET VALUE (RED) | | WB CORRECTION SETTINGS | | | |
|---|---|---|---|---|---|
| | | 0 | 1 | . . . | M |
| SENSOR GAIN | 0 dB | | | | |
| | 10 dB | | | | |
| | 20 dB | | | | |
| | . . . | | | | |
| | N dB | | | | |

| OFFSET VALUE (BLUE) | | WB CORRECTION SETTINGS | | | |
|---|---|---|---|---|---|
| | | 0 | 1 | . . . | M |
| SENSOR GAIN | 0 dB | | | | |
| | 10 dB | | | | |
| | 20 dB | | | | |
| | . . . | | | | |
| | N dB | | | | |

| OFFSET VALUE (GREEN) | | WB CORRECTION SETTINGS | | | |
|---|---|---|---|---|---|
| | | 0 | 1 | . . . | M |
| SENSOR GAIN | 0 dB | | | | |
| | 10 dB | | | | |
| | 20 dB | | | | |
| | . . . | | | | |
| | N dB | | | | |

WITHOUT CORRECTION

WITH CORRECTION
(WB DEVIATION IS CONSPICUOUS)

WITH CORRECTION
(WB DEVIATION IS PREVENTED)

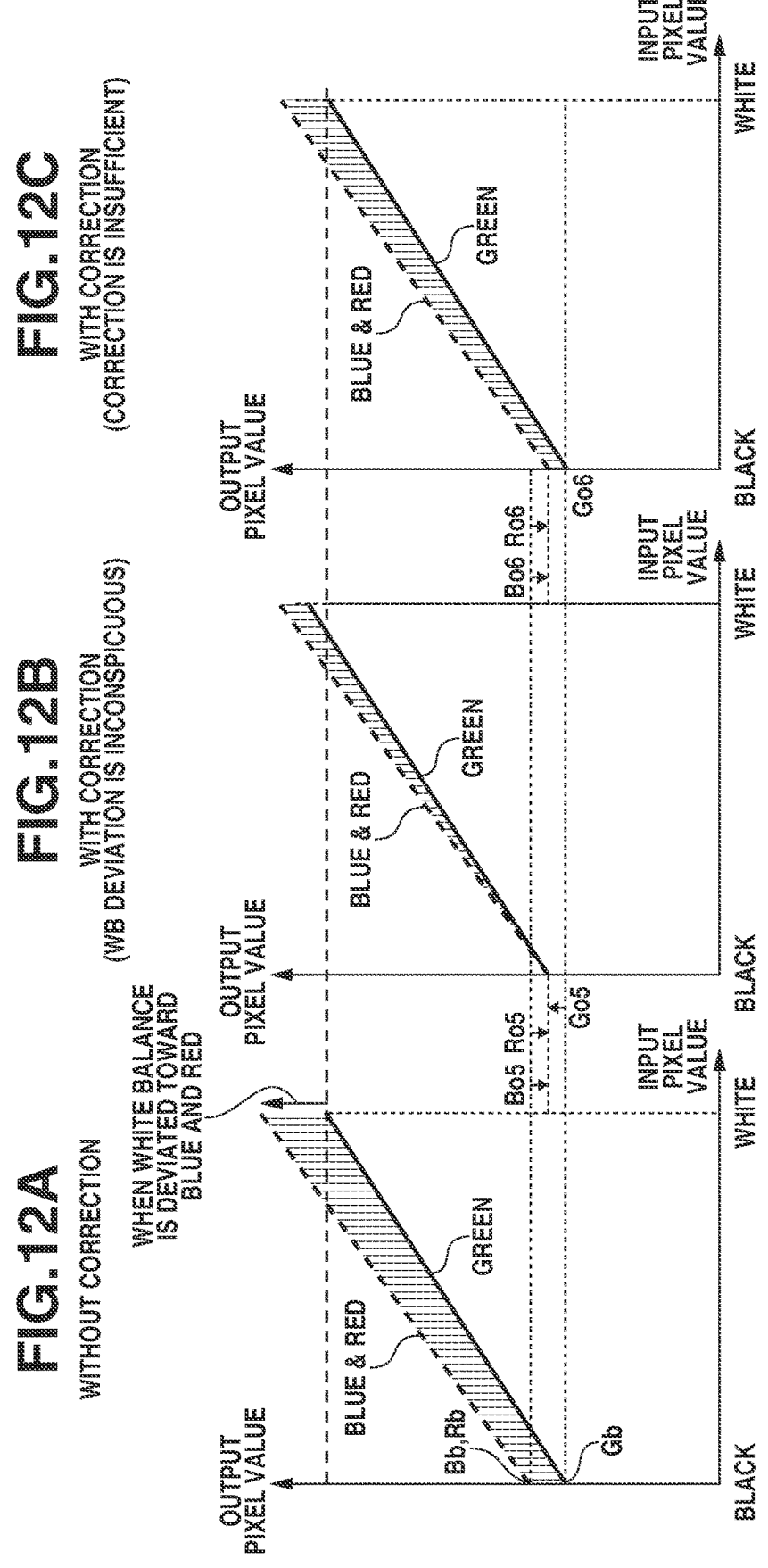

WITHOUT CORRECTION

WHEN WHITE BALANCE
IS DEVIATED
TOWARD GREEN

WITH CORRECTION
(PRIORITY IS GIVEN TO
INTERMEDIATE GRADATION)

WITH CORRECTION
(PRIORITY IS GIVEN TO LOW GRADATION)

FIG.16

| OFFSET VALUE (RED) | | COLOR TEMPERATURE | | |
|---|---|---|---|---|
| | | 2000 K | 3000 K | . . . |
| SENSOR GAIN | 0 dB | | | |
| | 10 dB | | | |
| | 20 dB | | | |
| | . . . | | | |

| OFFSET VALUE (BLUE) | | COLOR TEMPERATURE | | |
|---|---|---|---|---|
| | | 2000 K | 3000 K | . . . |
| SENSOR GAIN | 0 dB | | | |
| | 10 dB | | | |
| | 20 dB | | | |
| | . . . | | | |

| OFFSET VALUE (GREEN) | | COLOR TEMPERATURE | | |
|---|---|---|---|---|
| | | 2000 K | 3000 K | . . . |
| SENSOR GAIN | 0 dB | | | |
| | 10 dB | | | |
| | 20 dB | | | |
| | . . . | | | |

IMAGE PROCESSING APPARATUS, METHOD, AND STORAGE MEDIUM

BACKGROUND

Field

The present disclosure generally relates to image processing and, more particularly, to an image processing apparatus, an image processing method, and a storage medium.

Description of the Related Art

There are known imaging apparatuses that each perform white balance (WB) control based on a light source in an imaging environment, and outputs color images. There are also known imaging apparatuses that each correct black balance (BB) based on characteristics of an imaging sensor.

The input/output characteristics of an imaging sensor can be changed through the influence of individual product differences, temperature characteristics, or sensitivity (sensor gain) characteristics. With a change in the input/output characteristics of the imaging sensor, the black balance can be deviated. A deviated black balance causes coloring with a color that does not originally exist on a captured image, resulting a lower color reproducibility of an object.

To solve the issue, for example, Japanese Patent Application Laid-Open No. 2007-208884 discusses a technique that stores table data in which a luminance signal and an offset value of a color difference signal are associated with each other, and determines the offset value of the color difference signal based on the luminance signal. That technique allows appropriate white balance control in consideration of the amount of deviation in optical black that is determined at the time of manufacturing and is not varied by the situations in use.

SUMMARY

According to some embodiments, an image processing apparatus includes at least one processor, and a memory coupled to the at least one processor storing instructions that, when executed by the processor, cause the processor to function as a detection unit configured to detect deviation in black balance in an input image, an acquisition unit configured to acquire information on white balance of the input image, a calculation unit configured to calculate, in a case where the detection unit detects deviation in the black balance, a correction value to correct the deviation in the black balance based on the information on the white balance, and a correction unit configured to correct the deviation in the black balance based on the correction value calculated by the calculation unit.

Further features of the present disclosure will become apparent from the following description of exemplary embodiments with reference to the attached drawings.

BRIEF DESCRIPTION OF THE DRAWINGS

FIG. 2 illustrates an example of table data according to some embodiments.

FIGS. 12A to 12C each illustrate an example of the black balance control according to the third exemplary embodiment.

FIG. 16 illustrates an example of table data according to the exemplary embodiments of the fifth exemplary embodiment.

DESCRIPTION OF THE EMBODIMENTS

Various exemplary embodiments, features, and aspects of the present disclosure will be described in detail below with reference to the accompanying drawings. The exemplary embodiments described below are examples for implementing the present disclosure, and should be appropriately corrected or changed based on the configuration of an apparatus to which the present disclosure is applied and various kinds of conditions. The present disclosure is not limited to the following exemplary embodiments. Further, parts of the exemplary embodiments described below may be appropriately combined.

Figure 1:
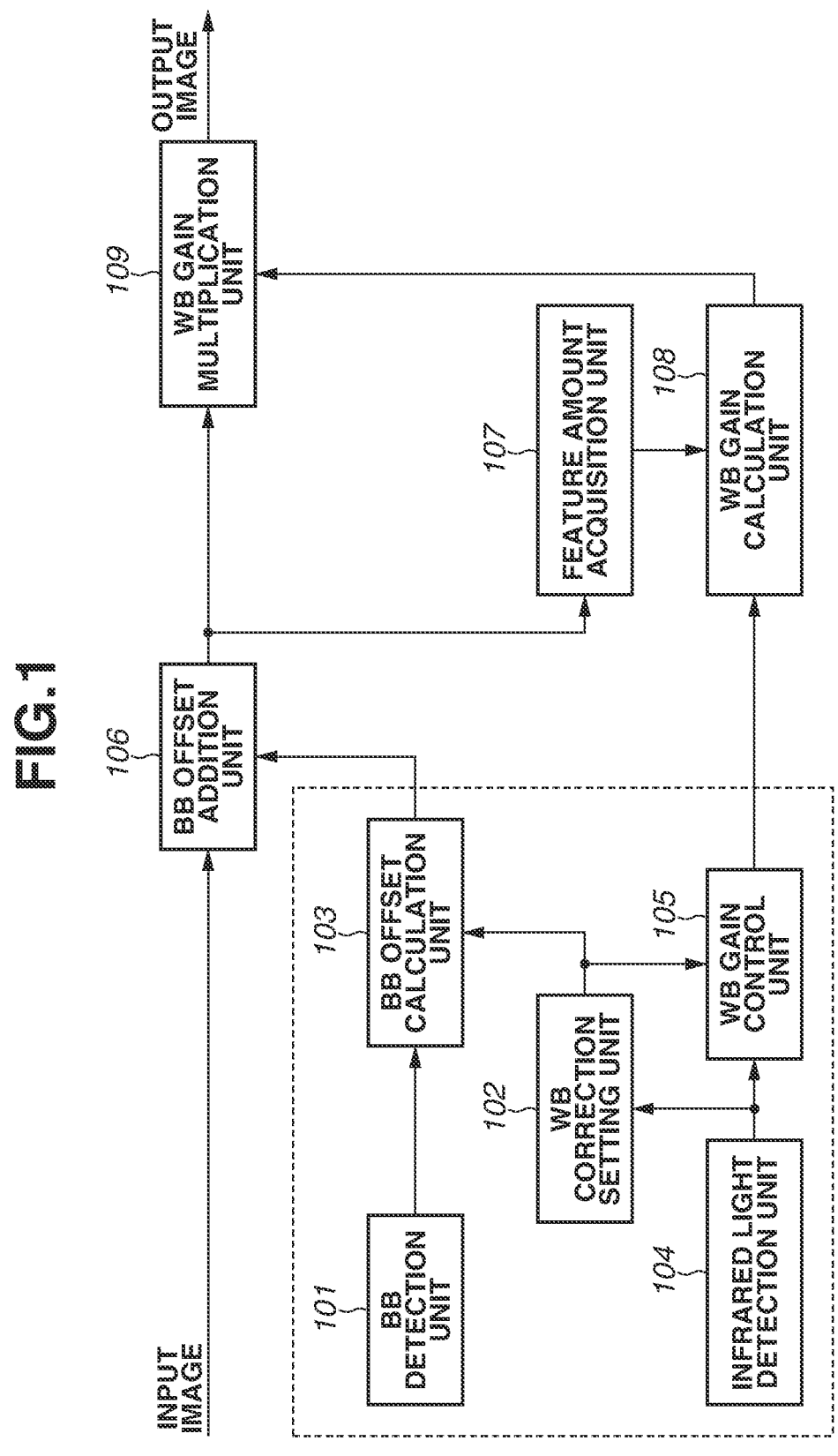
FIG. 1 illustrates an example of the functional configuration of an image processing apparatus according to a first exemplary embodiment.

An image processing apparatus according to a first exemplary embodiment of the present disclosure will be described with reference to FIG. 1.

An input image is captured by an imaging unit (not illustrated) that includes a lens and an imaging sensor. The input image is image data including a plurality of pixels, or an image signal, and includes a plurality of pieces of color information. The colors are, for example, red (R), green (G), and blue (B), and the image data (signal) corresponds to the quantity of light that has passed through color filters corresponding to the respective colors provided in the imaging sensor (not illustrated) and that has been converted into an electric signal by the imaging sensor.

The color filters allow part of infrared light (invisible light) as well as visible light corresponding to red, green, and blue to pass therethrough. Typical imaging apparatuses are each provided with an infrared cutoff filter (IRCF) that removes the infrared light component, providing images close to human vision.

A pixel value of each color of the input image is added to an offset value to correct the black balance (BB) appropriately, and is multiplied by a white balance gain (WB gain) to correct the WB appropriately, producing an output image. Examples of a white balance gain includes a red gain to adjust the redness of an output image and a blue gain to adjust the blueness of an output image. Examples of an offset value include a red offset value, a green offset value, and a blue offset value for respective colors.

In the present exemplary embodiment, in a configuration in which the input image is subjected to offset addition and then to multiplication by a white balance gain, the amounts of the offsets to correct the black balance are determined based on the amount of deviation in the black balance and the amount of deviation in the white balance. Further, in the present exemplary embodiment, in imaging with the infrared light taken in, the white balance can be intentionally deviated based on a set value.

A BB detection unit (detection unit) 101 detects the amount of deviation in the black balance, and outputs the amount of deviation in the black balance to a BB offset calculation unit 103. The amount of deviation in the black balance is increased as a gain in the sensor or a gain (sensor gain) to be multiplied to an output signal of the sensor is larger. Thus, for example, the BB detection unit 101 outputs a value of the sensor gain as the amount of deviation in the black balance to the BB offset calculation unit 103. The value of the gain is represented by, for example, a decibel (dB) value.

A WB correction setting unit 102 sets the amount of deviation in the white balance (WB), acquires a detection result from an infrared light detection unit 104, and outputs the amount of deviation in the white balance to the BB offset calculation unit 103 and a WB gain control unit 105. The amount of deviation in the white balance is represented by, for example, a value from 0 to 10 (WB correction setting) settable by a user. The amount of deviation toward magenta is increased as the value is smaller, whereas the amount of deviation toward green is increased as the value is larger.

If the colors of the input image are influenced by infrared light from the detection result acquired from the infrared light detection unit 104, the WB correction setting unit 102 outputs the amount of deviation set in the white balance to the BB offset calculation unit 103 and the WB gain control unit 105. If the colors of the input image are not influenced by the infrared light, the WB correction setting unit 102 does not output the amount of deviation set in the white balance to the BB offset calculation unit 103 and the WB gain control unit 105, but outputs information representing no deviation in the white balance.

The BB offset calculation unit 103 acquires the amount of deviation in the black balance from the BB detection unit 101. Further, the BB offset calculation unit 103 acquires the amount of deviation in the white balance from the WB correction setting unit 102, calculates the amount of red offset, the amount of green offset, and the amount of blue offset, and outputs the calculated amounts of the offsets to a BB offset addition unit 106. The amounts of the offsets are determined with reference to, for example, table data (lookup table (LUT)) associated with the sensor gain (amount of deviation in black balance) and the WB correction setting (amount of deviation in white balance) as illustrated in FIG. 2. In FIG. 2, M denotes the maximum value of the WB correction setting, and N denotes the maximum value of the sensor gain.

The infrared light detection unit (determination unit) 104 determines whether the colors of the input image are influenced by the infrared light taken in by the imaging sensor, and outputs a determination result to the WB correction setting unit 102 and the WB gain control unit 105. For example, with an IRCF (not illustrated) inserted in the optical axis of the lens of the imaging unit, the infrared light detection unit 104 detects no influence of the infrared light on the colors of the input image. In contrast, without an IRCF inserted in the optical axis of the lens of the imaging unit (is removed from optical axis), the infrared light detection unit 104 detects the influence of the infrared light on the colors of the input image.

The WB gain control unit 105 acquires the amount of deviation in the white balance from the WB correction setting unit 102, acquires the detection result from the infrared light detection unit 104, determines parameters to calculate the white balance gain, and outputs the parameters to a WB gain calculation unit 108. Examples of the parameters to calculate the white balance gain include parameters determining an effective range of the white balance gain.

Figure 3:
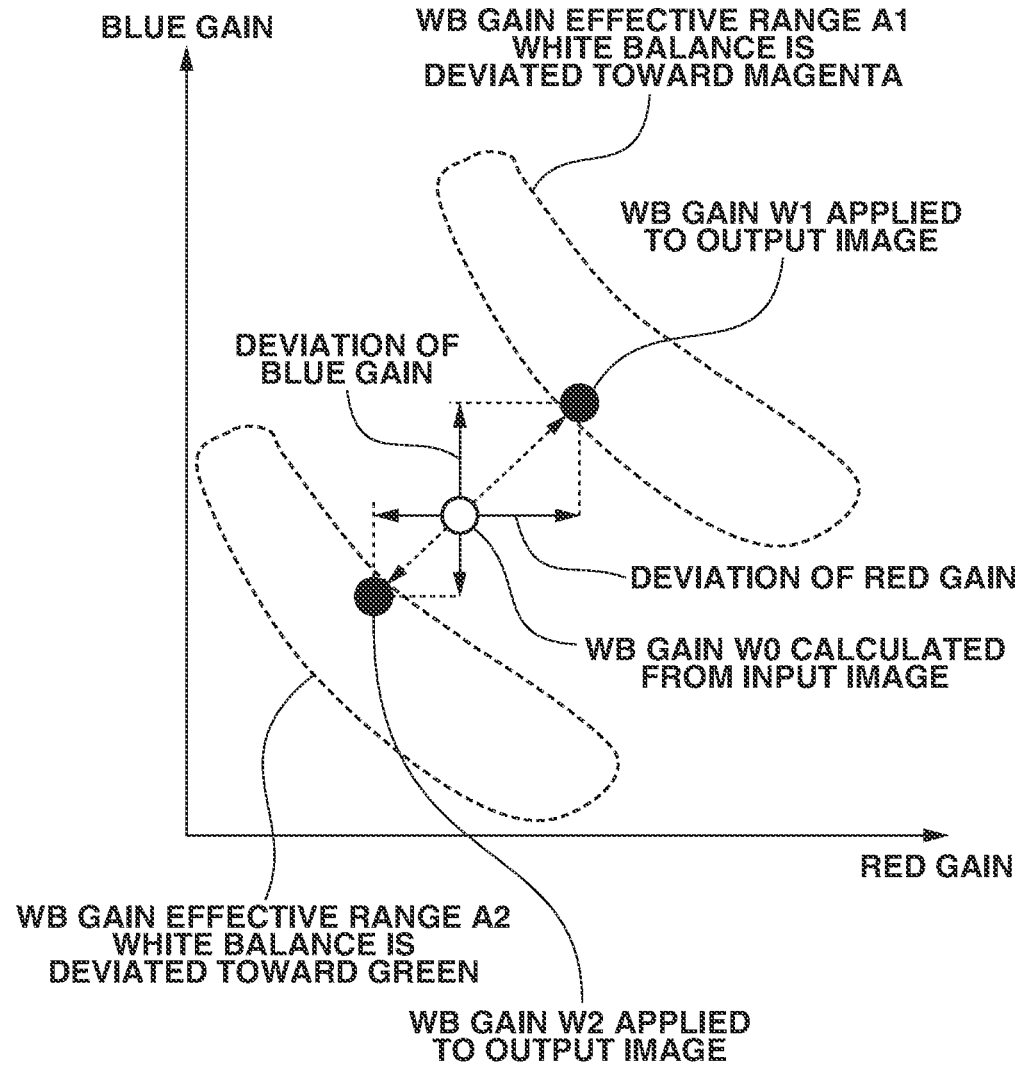
FIG. 3 illustrates an example of white balance control according to some embodiments.

The effective range of the white balance gain is determined such that, for example, with the influence of the infrared light on the input image, the red gain and the blue gain each have a larger value as the amount of deviation in the white balance toward magenta is larger (e.g., range A1 in FIG. 3). On the other hand, the effective range of the white balance gain is determined such that, with the influence of the infrared light on the input image, the red gain and the blue gain each have a smaller value as the amount of deviation in the white balance toward green is larger (e.g., range A2 in FIG. 3).

The BB offset addition unit 106 acquires the amount of red offset, the amount of green offset, and the amount of blue offset from the BB offset calculation unit 103, adds the amounts of the offsets to the input image, and outputs an image after the offset addition, to a feature amount acquisition unit 107 and a WB gain multiplication unit 109.

The feature amount acquisition unit 107 acquires the image after the offset addition, from the BB offset addition unit 106, calculates a feature amount relating to the colors, and outputs the feature amount to the WB gain calculation unit 108. More specifically, the feature amount acquisition unit 107 calculates color information for each rectangular area determined by image data included in each rectangular area of a plurality of rectangular areas case into which the image is divided. The color information is, for example, a representative value of a color difference signal for each rectangular area, and a representative value is, for example, an average or a mode.

The WB gain calculation unit 108 acquires the parameters determining the effective range of the white balance gain from the WB gain control unit 105, acquires the color information for each area from the feature amount acquisition unit 107, calculates the white balance gain (WB gain), and outputs the white balance gain to the WB gain multiplication unit 109.

More specifically, the WB gain calculation unit 108 calculates the representative value of the acquired color information for each area. Further, the WB gain calculation unit 108 calculates a first white balance gain (e.g., WB gain W0 in FIG. 3) at which the representative value of the color information is a predetermined target value. Further, the WB gain calculation unit 108 determines the effective range of the white balance gain based on the parameters determining the effective range of the white balance gain. With the first white balance gain in the effective range of the white balance gain, the WB gain calculation unit 108 outputs the first white balance gain to the WB gain multiplication unit 109. In contrast, with the first white balance gain out of the effective range of the white balance gain, the WB gain calculation unit 108 outputs a second white balance gain (e.g., W1 or W2 in FIG. 3) that is obtained by correcting the first white balance gain, to the WB gain multiplication unit 109. For example, the second white balance gain is a white balance gain in the effective range of the white balance gain and closest to the first white balance gain.

The WB gain multiplication unit 109 acquires the image after the offset addition, from the BB offset addition unit 106, acquires the white balance gain from the WB gain calculation unit 108, generates an output image by multiplying the image after the offset addition by the WB gain, and outputs the output image.

An example of a processing procedure for the image processing apparatus according to the present exemplary embodiment will now be described with reference to FIG. 4.

Figure 4:
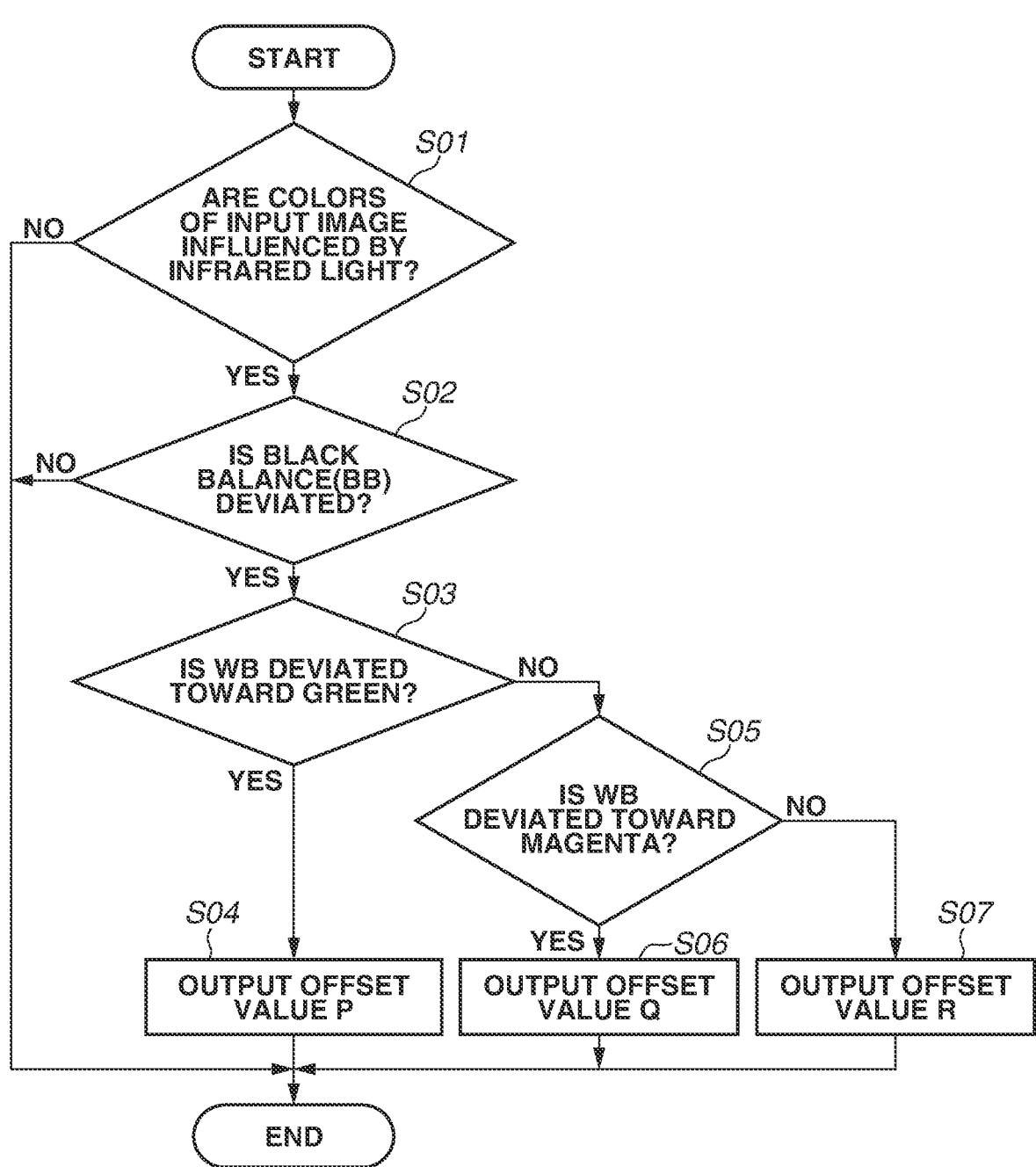
FIG. 4 is a flowchart illustrating an example of a part of a processing procedure according to some embodiments.

FIG. 4 is a flowchart illustrating an example of a part of the procedure of the processing performed by the image processing apparatus according to the present exemplary embodiment.

In step S01, the infrared light detection unit 104 detects whether the colors of the input image are influenced by the infrared light taken in by the imaging sensor. If it is detected that the colors of the input image are influenced by the infrared light (YES in step S01), the processing proceeds to step S02. If it is detected that the colors of the input image are not influenced by the infrared light (NO in step S01), the processing ends.

In step S02, the BB detection unit 101 detects whether the black balance is deviated.

If it is detected that the black balance is deviated (YES in step S02), the processing proceeds to step S03. If it is detected that the black balance is not deviated (NO in step S02), the processing ends.

In step S03, the WB correction setting unit 102 detects whether the white balance is deviated toward green. If it is detected that the white balance is deviated toward green (YES in step S03), the processing proceeds to step S04. If it is detected that the white balance is not deviated toward green (NO in step S03), the processing proceeds to step S05.

In step S04, the BB offset calculation unit 103 outputs an offset value P suitable for the white balance deviated toward green, and the processing ends.

In step S05, the WB correction setting unit 102 detects whether the white balance is deviated toward magenta. If it is detected that the white balance is deviated toward magenta (YES in step S05), the processing proceeds to step S06. If it is detected that the white balance is not deviated toward magenta (NO in step S05), the processing proceeds to step S07.

In step S06, the BB offset calculation unit 103 outputs an offset value Q suitable for the white balance deviated toward magenta, and the processing ends.

In step S07, the BB offset calculation unit 103 outputs an offset value R suitable for the white balance that is not deviated, and the processing ends.

Based on the offset values (correction values) calculated by the BB offset calculation unit 103, deviation in the black balance is adjusted by the BB offset addition unit (correction unit) 106.

Effects by the present exemplary embodiment will now be described. FIGS. 5A to 5C and FIGS. 6A to 6C each illustrate an example of control of black balance correction values (offset values) according to the present exemplary embodiment.

Figure 5:
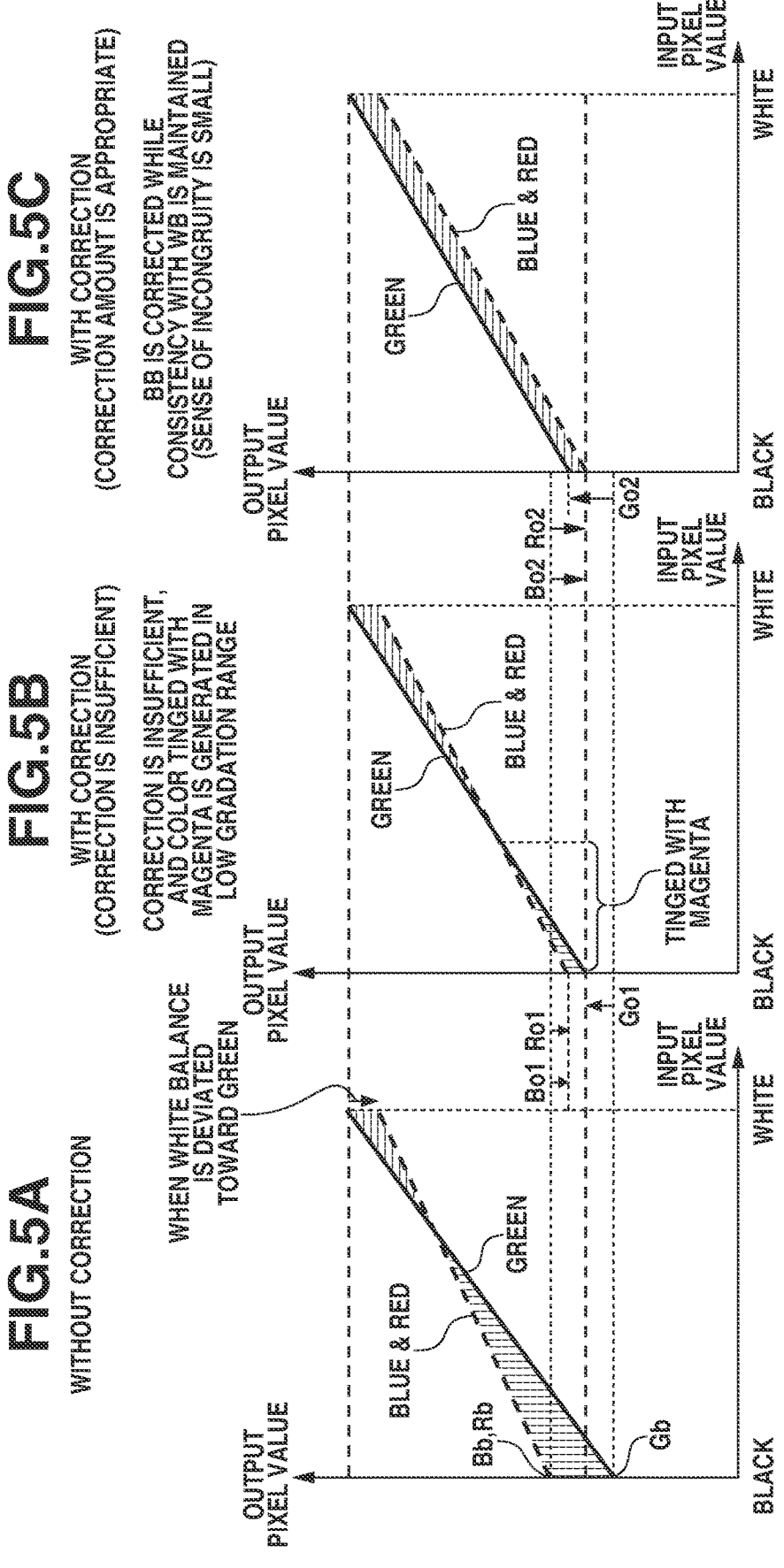
FIGS. 5A to 5C each illustrate an example of black balance control according to the first exemplary embodiment.
Figure 6:
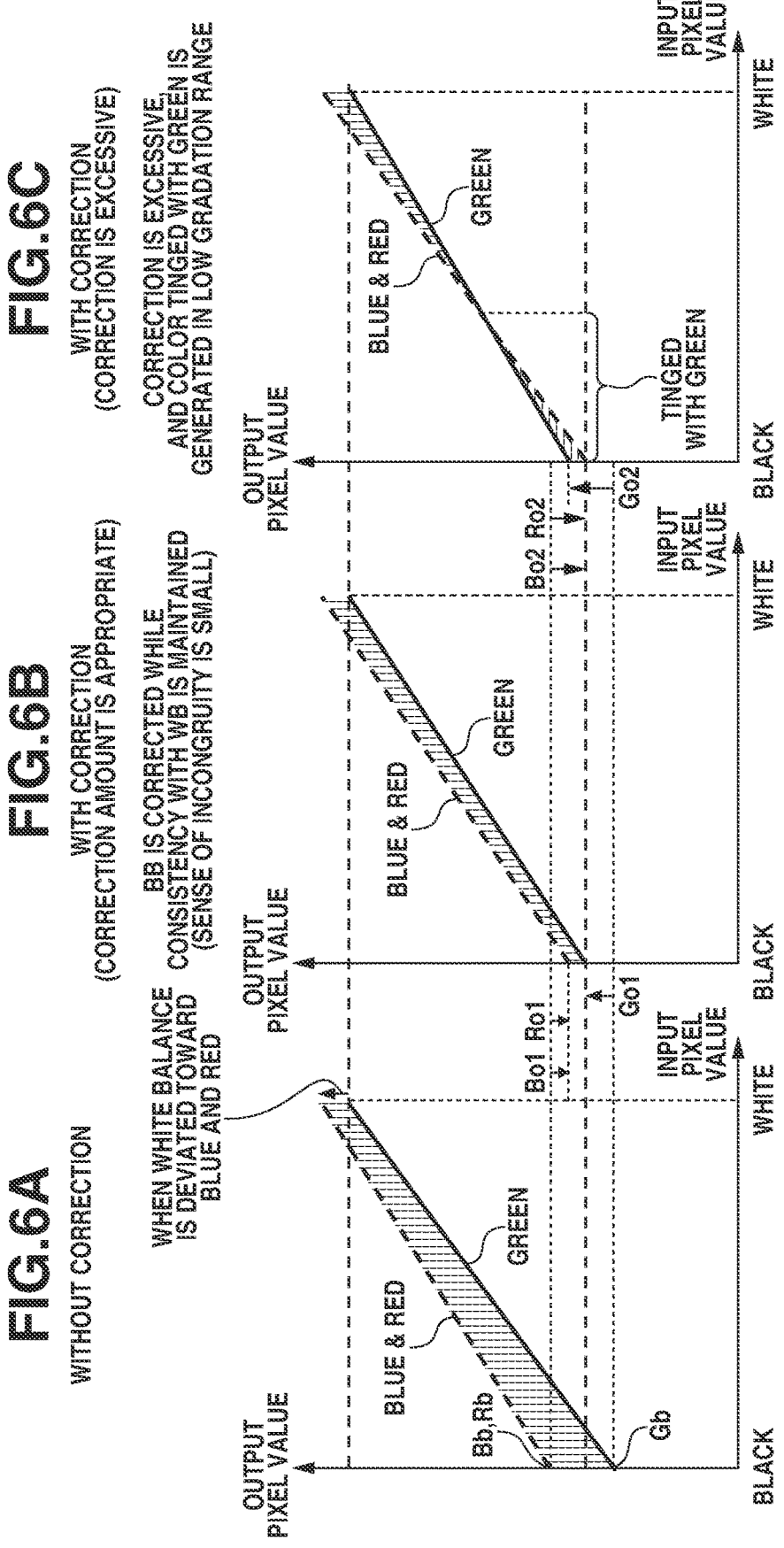
FIGS. 6A to 6C each illustrate an example of the black balance control according to the first exemplary embodiment.

Graphs in FIGS. 5A to 5C and FIGS. 6A to 6C each illustrate characteristics of the pixel values of the input image and the pixel values of the output image when achromatic objects from black to white are captured. FIG. 5A and FIG. 6A at the left ends each illustrate an example with the black balance that is not corrected. FIG. 5B and FIG. 6B at the centers and FIG. 5C and FIG. 6C at the right ends each illustrate an example with the black balance corrected. The amounts of the offsets in FIG. 5B and FIG. 6B are different from the amounts of the offsets in FIG. 5C and FIG. 6C, but the amounts of the offsets in FIG. 5B and the amounts of the offsets in FIG. 6B are equal to each other, and the amounts of the offsets in FIG. 5C and the amounts of the offsets in FIG. 6C are equal to each other. In FIG. 5B and FIG. 6B, the amount of blue offset is denoted by Bo1, the amount of red offset is denoted by Ro1, and the amount of green offset is denoted by Go1. In FIG. 5C and FIG. 6C, the amount of blue offset is denoted by Bo2, the amount of red offset is denoted by Ro2, and the amount of green offset is denoted by Go2. The magnitude of the amount of each offset is represented by the length of an arrow. An upward arrow represents positive offset (addition), whereas a downward arrow represents negative offset (subtraction). Non-illustration of arrow represents no offset (zero). In FIG. 5B and FIG. 6B, the amounts of the offsets are smaller than the amounts of the offsets in FIG. 5C and FIG. 6C, and the black balance is moderately corrected.

In contrast, in FIG. 5C and FIG. 6C, the amounts of the offsets are greater than the amounts of the offsets in FIG. 5B and FIG. 6B, and the black balance is actively corrected. Further, for simplicity, red characteristics and blue characteristics are made equal to each other, and green characteristics are made different.

Without correction in FIG. 5A, the blue pixel value and the red pixel value are greater in the black output pixel value than the green pixel value, which indicates that the black balance is deviated toward magenta. Such a phenomenon easily occurs with a larger sensor gain, and the amount of deviation in the black balance is increased as the sensor gain is larger. In contrast, the green pixel value is greater in the white output pixel value than the blue pixel value and the red pixel value, which indicates that the white balance is deviated toward green based on the set value of the WB correction setting unit 102. In other words, the white balance and the black balance are deviated in opposite directions.

Without correction in FIG. 6A, the blue pixel value and the red pixel value are greater in the black output pixel value than the green pixel value, which indicates that the black balance is deviated toward magenta. In addition, the blue pixel value and the red pixel value are greater in the white output pixel value than the green pixel value, which indicates that the white balance is deviated toward magenta based on the set value of the WB correction setting unit 102. In other words, the white balance and the black balance are deviated in the same direction.

In FIG. 5B, the blue pixel value and the red pixel value are slightly greater in the black output pixel value than the green pixel value even after the black balance correction, which indicates that the black balance is deviated toward magenta. In this case, the deviation in the black balance is conspicuous because white and black are deviated toward different colors.

In contrast, in FIG. 6B, although the amounts of the offsets are equal to the amounts of the offsets in FIG. 5B, white and black both are deviated toward magenta. Thus, the deviation in the black balance is inconspicuous.

Likewise, in FIG. 5C, white and black are both deviated toward green after the black balance correction. Thus, the deviation in the black balance is inconspicuous.

In contrast, in FIG. 6C, the white balance is deviated toward magenta, and the black balance is deviated toward green. Since white and black are deviated toward different colors, the deviation in the black balance is conspicuous.

As described above, with white and black deviated toward different colors before the black balance correction, it is desirable to avoid insufficient correction. In contrast, with white and black deviated toward the same color before the black balance correction, it is desirable to avoid excessive correction. In other words, with white and black deviated toward different colors, the amounts of the offsets are desirably made large. In contrast, with white and black deviated toward the same color, the amounts of the offsets are desirably made small. Thus, it is suitable to apply the amounts of the offsets in FIG. 5C to the cases of FIG. 5A to 5C, and to apply the offset amounts in FIG. 6B to the cases of FIGS. 6A to 6C.

In the black balance correction according to the present exemplary embodiment, the BB offset calculation unit 103 can determine the amounts of the offsets with reference to the amount of deviation in the black balance and the amount of deviation in the white balance. As a result, appropriate amounts of the offsets can be applied based on the deviation in the white balance. Thus, with white and black deviated toward different colors as described above, the amounts of the offsets can be made large. With white and black deviated toward the same color, the amounts of the offsets can be made small. In other words, this configuration allows black balance correction suitable for the white balance.

In the present exemplary embodiment, the magnitude of the sensor gain is used as the amount of deviation in the black balance; however, the present disclosure is not limited thereto. For example, a shutter speed, a sensor temperature, an environment temperature, or a continuous operation time of the imaging apparatus can be used as the amount of deviation in the black balance.

In the present exemplary embodiment, the WB correction value set by the WB correction setting unit 102 is used as the deviation amount of the white balance; however, the present disclosure is not limited thereto. The amount of deviation in the white balance may be, for example, the difference between the first white balance gain and the second white balance gain calculated by the WB gain calculation unit 108 in the past (e.g., one frame before).

An image processing apparatus according to a second exemplary embodiment of the present disclosure will now be described with reference to FIG. 7.

In the present exemplary embodiment, in the configuration in which the input image is subjected to offset addition and then to multiplication by the white balance gain, the amounts of the offsets to correct the black balance are determined based on the amount of deviation in the black balance and presence/absence of the influence by the infrared light. Further, in the present exemplary embodiment, even if imaging is performed by taking in infrared light, the white balance can be appropriately maintained.

Figure 7:
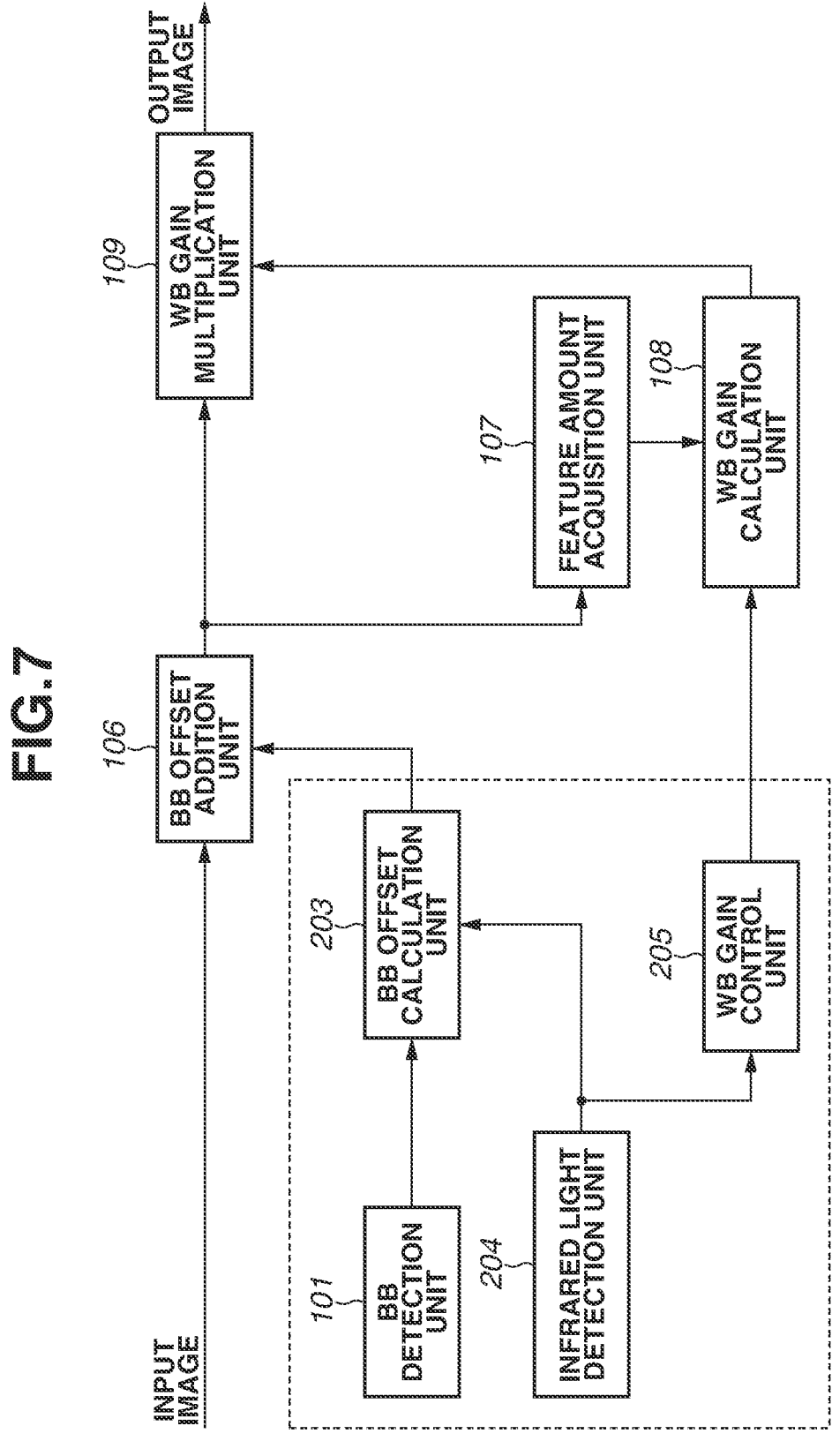
FIG. 7 illustrates an example of the functional configuration of an image processing apparatus according to a second exemplary embodiment.

FIG. 7 is a configuration diagram illustrating an example of a functional configuration of the image processing apparatus according to the present exemplary embodiment.

Like numbers in the first exemplary embodiment refer to like functional units in the present exemplary embodiment, and redundant descriptions of the functional units will be omitted.

A BB offset calculation unit 203 acquires the amount of deviation in the black balance from the BB detection unit 101, acquires a detection result of the influence of infrared light from an infrared light detection unit 204, calculates the amount red offset, the amount of green offset, and the amount of blue offset, and outputs the calculated amounts of the offsets to the BB offset addition unit 106.

The infrared light detection unit 204 detects whether the colors of the input image are influenced by the infrared light taken in by the imaging sensor, and outputs a detection result to the BB offset calculation unit 203 and a WB gain control unit 205.

The WB gain control unit 205 acquires the detection result from the infrared light detection unit 204, determines the parameters to calculate the white balance gain, and outputs the parameters to the WB gain calculation unit 108.

The parameters to calculate the white balance gain are, for example, parameters determining an effective range of the white balance gain.

The effective range of the white balance gain is determined such that, for example, with the influence of the infrared light on the input image, the red gain and the blue gain each have a small value compared with the case of no influence of the infrared light on the input image. With the influence of the infrared light on the input image, the white balance is deviated toward magenta. Thus, making the red gain and the blue gain small as compared with the case of no influence of the infrared light on the input image allows an appropriate white balance to be held even if the input image is influenced by the infrared light.

Figure 8:
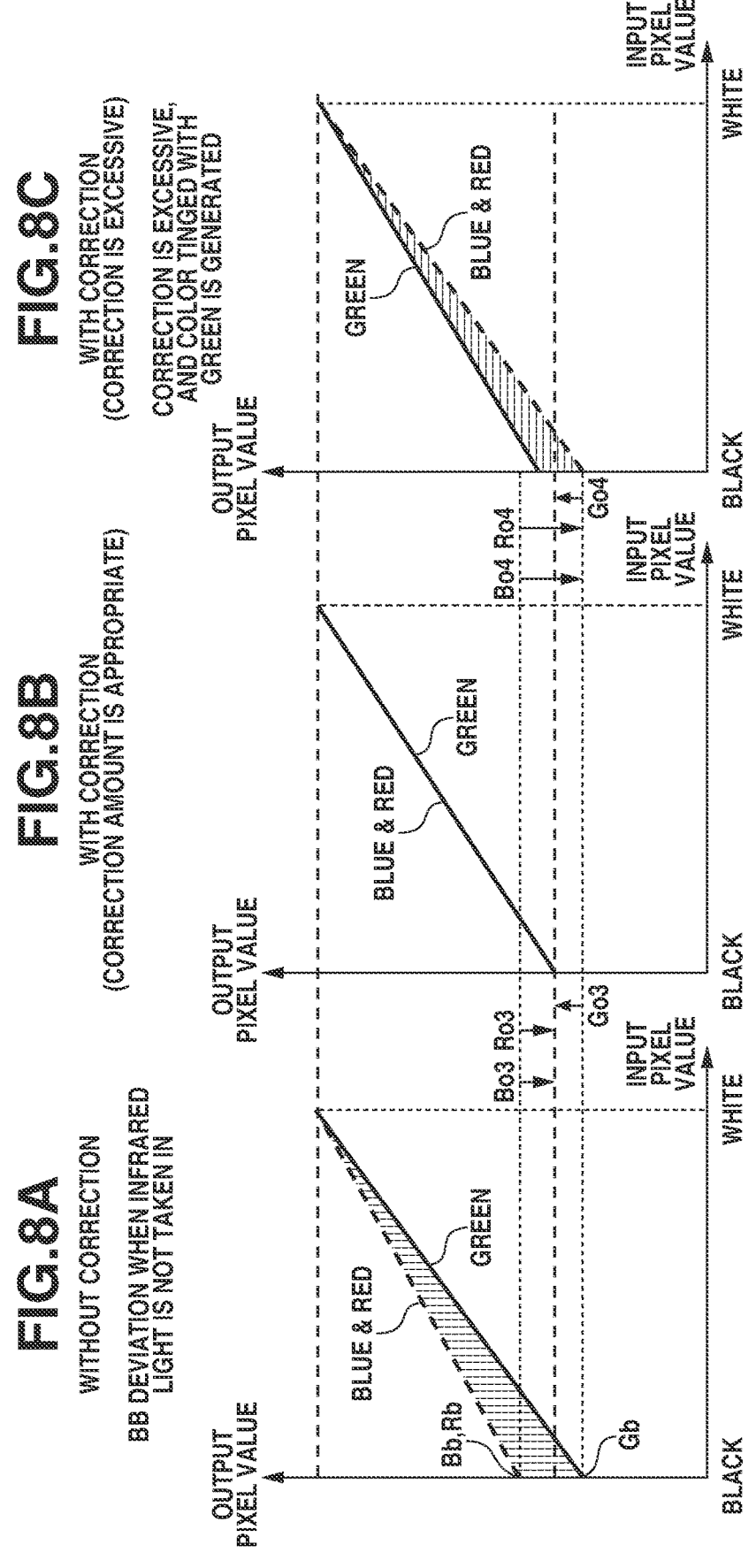
FIGS. 8A to 8C each illustrate an example of black balance control according to the second exemplary embodiment.

Effects by the present exemplary embodiment will now be described. FIGS. 8A to 8C and FIGS. 9A to 9C each illustrate an example of control of black balance correction values (offset values) according to the present exemplary embodiment. FIGS. 8A to 8C each illustrate an example without influence of the infrared light on the input image, and FIGS. 9A to 9C each illustrate an example with the influence of the infrared light on the input image.

Without correction in FIG. 8A, the blue pixel value and the red pixel value are greater in the black output pixel value than the green pixel value, which indicates that the black balance is deviated toward magenta. Such a phenomenon easily occurs with a larger sensor gain, and the amount of deviation in the black balance is increased as the sensor gain is larger. In contrast, the red, green, and blue pixel values are substantially coincident with one another in the white output pixel value that has appropriate white balance, and coloring is not generated.

Figure 9:
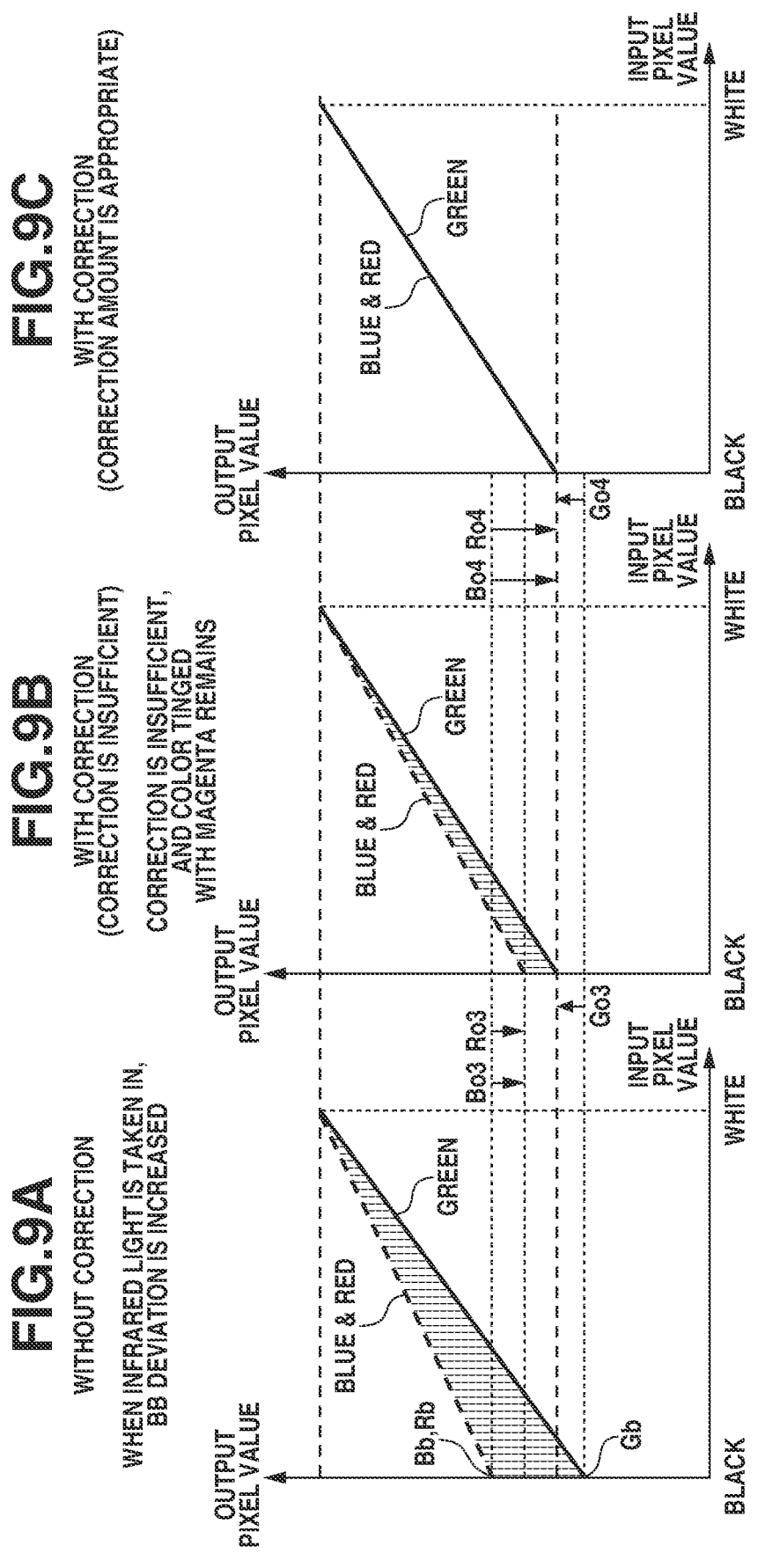
FIGS. 9A to 9C each illustrate an example of the black balance control according to the second exemplary embodiment.

Without correction in FIG. 9A, the blue pixel value and the red pixel value are also greater in the black output pixel value than the green pixel value, which indicates that the black balance is deviated toward magenta. However, since the input image is influenced by the infrared light, the deviation in the black balance is large as compared with the case without influence of the infrared light on the input image. In contrast, the red, green, and blue pixel values are substantially coincident with one another in the white output pixel value that has appropriate white balance, and coloring is not generated.

In FIG. 8B, the red, green, and blue pixel values are substantially coincident with one another in the black output pixel value after the black balance correction, and coloring is not generated.

In contrast, in FIG. 9B, although the amounts of the offsets are equal to the amounts of the offsets in FIG. 8B, correction is insufficient because the deviation in the black balance is increased due to the influence of the infrared light, and the black balance is deviated toward magenta.

In FIG. 8C, the amount of correction of the black balance is increased as compared with the case of FIG. 8B. Thus, the black balance is excessively corrected, and the black balance is deviated toward green.

In contrast, in FIG. 9C, the amounts of the offsets are equal to the amounts of the offsets in FIG. 8C; however, the red, green, and blue pixel values are substantially coincident with one another in the black output pixel value, and the black balance is not deviated.

Consequently, when the set amounts of the offsets are optimum for the case without influence of the infrared light, the correction of the black balance is insufficient with the influence of the infrared light on the input image. In contrast, when the set amounts of the offsets are optimum for the case with the influence of the infrared light on the input image, the black balance is excessively corrected without influence of the infrared light on the input image. For these reasons, it is suitable to apply the amounts of the offsets in FIG. 8B without influence of the infrared light on the input image, and apply the amounts of the offsets in FIG. 9C with the influence of the infrared light on the input image.

In the black balance correction according to the present exemplary embodiment, the BB offset calculation unit 103 can determine the amounts of the offsets with reference to the amount of deviation in the black balance and presence/absence of influence by the infrared light. As a result, the appropriate amounts of the offsets can be used based on presence/absence of influence by the infrared light. Thus, as described above, with the influence of the infrared light on the input image, the amounts of the offsets can be made large, whereas without influence of the infrared light on the input image, the amounts of the offsets can be made small. Consequently, this configuration allows suitable black balance correction based on presence/absence of influence by the infrared light.

An image processing apparatus according to a third exemplary embodiment of the present disclosure will now be described with reference to FIG. 10.

In the present exemplary embodiment, in a configuration in which the input image is subjected to multiplication by the white balance gain and then to offset addition, the amounts of the offsets to correct the black balance are determined based on the amount of deviation in the black balance and the amount of deviation in the white balance. Further, in the present exemplary embodiment, when imaging is performed by taking in infrared light, the white balance can be intentionally deviated based on a set value.

It is originally desirable to adjust the white balance by white balance gain multiplication after the black balance is adjusted by offset addition. However, in some cases, offset addition to adjust the black balance is made after white balance gain multiplication depending on the system configuration or other factors. In the present exemplary embodiment, the present disclosure is applied to such a case.

Figure 10:
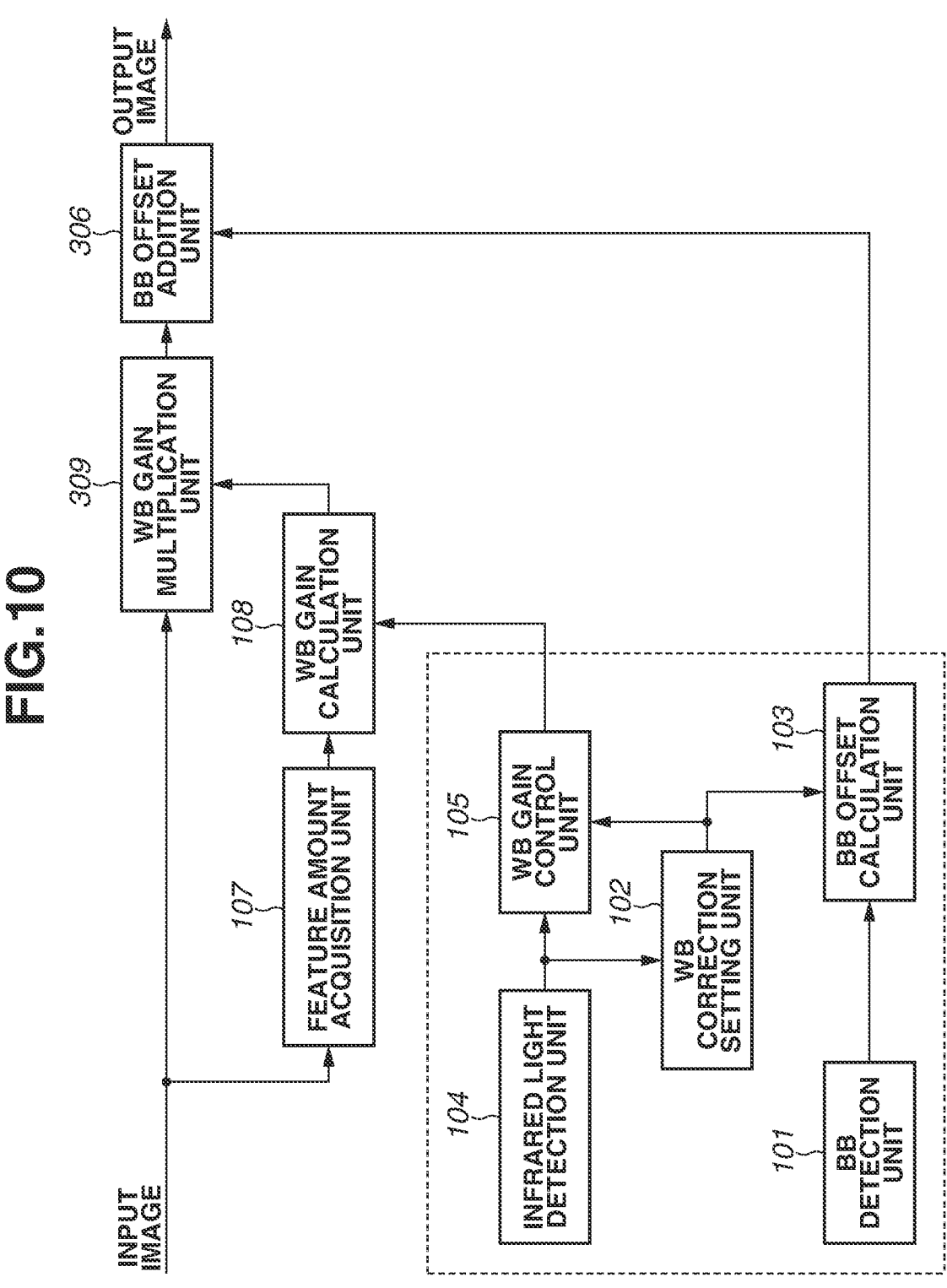
FIG. 10 illustrates an example of the functional configuration of an image processing apparatus according to a third exemplary embodiment.

FIG. 10 is a configuration diagram illustrating an example of a functional configuration of the image processing apparatus according to the present exemplary embodiment.

Like numbers in the first exemplary embodiment refer to like functional units, and redundant descriptions of the functional units will be omitted.

A BB offset addition unit 306 acquires an image after white balance gain multiplication, from a WB gain multiplication unit 309, and acquires the amount of red offset, the amount of green offset, and the amount of blue offset from the BB offset calculation unit 103. Further, the BB offset addition unit 306 adds the amounts of the offsets to the image after the white balance gain multiplication, to generate and output an output image.

The WB gain multiplication unit 309 acquires the white balance gain from the WB gain calculation unit 108, multiplies the input image by the white balance gain, and outputs the image after the white balance gain multiplication, to the BB offset addition unit 306.

Effects by the present exemplary embodiment will be described. FIGS. 11A to 11C and FIGS. 12A to 12C each illustrate an example of control of black balance correction values (offset values) according to the present exemplary embodiment.

Figures 11A, 11B, 11C:
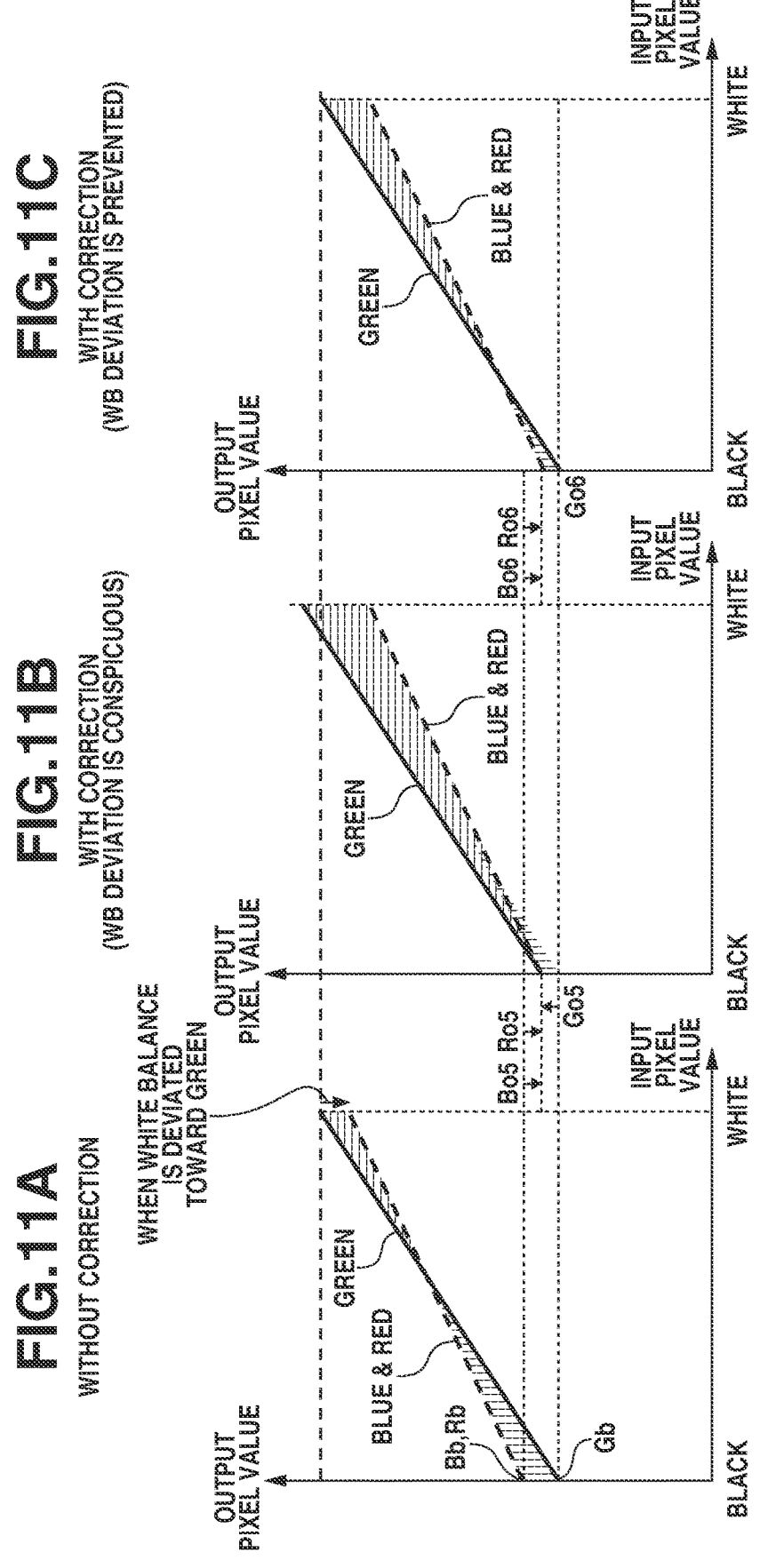
FIGS. 11A to 11C each illustrate an example of black balance control according to the third exemplary embodiment.

Without correction in FIG. 11A, the blue pixel value and the red pixel value are greater in the black output pixel value than the green pixel value, which indicates that the black balance is deviated toward magenta. Such a phenomenon easily occurs with a larger sensor gain, and the amount of deviation in the black balance is increased as the sensor gain is larger. In contrast, the green pixel value is greater in the white output pixel value than the blue pixel value and the red pixel value, which indicates that the white balance is deviated toward green based on the set value of the WB correction setting unit 102. In other words, the white balance and the black balance are deviated in opposite directions.

Without correction in FIG. 12A, the blue pixel value and the red pixel value are greater in the black output pixel value than the green pixel value, which indicates that the black balance is deviated toward magenta. In addition, the blue pixel value and the red pixel value are greater in the white output pixel value than the green pixel value, which indicates that the white balance is deviated toward magenta based on the set value of the WB correction setting unit 102. In other words, the white balance and the black balance are deviated in the same direction.

In FIG. 11B, the red, green, and blue pixel values are substantially coincident with one another in the black output pixel value after the black balance correction, and coloring is not generated. In contrast, in the present exemplary embodiment, since the offset addition is performed after the white balance gain is multiplied, the amount of deviation in the white balance is increased as compared with the case of FIG. 11A. As a result, in the case of FIG. 11B, colors tinged with green are conspicuous in the output image.

In contrast, in FIG. 12B, the red, green, and blue pixel values are substantially coincident with one another in the black output pixel value after the black balance correction, and coloring is not generated. The white balance in FIG. 12A cannot be maintained, but the image has a small sense of incongruity in quality because the white balance is changed in the direction in which the amount of deviation is reduced, namely, in the direction in which coloring is reduced.

In FIG. 11C, the amounts of the offsets are made smaller than the offset amounts in FIG. 11B. As a result, the deviation in the black balance and the deviation in the white balance are between that of FIG. 11A and that of FIG. 11B. In other words, the white balance can be prevented from being excessively deviated toward green as compared with the case of FIG. 11B while the deviation in the black balance toward magenta is reduced as compared with the case of FIG. 11A.

In FIG. 12C, the amounts of the offsets are also made smaller than the offset amounts in the case of FIG. 12B. Thus, the deviation in the black balance and the deviation in the white balance are between that of FIG. 12A and that of FIG. 12B. In other words, the white balance in the case of FIG. 12A can be easily maintained as compared with the case of FIG. 12B while the deviation in the black balance toward magenta is reduced as compared with the case of FIG. 12A.

As described above, with white and black deviated toward different colors before the black balance correction, the correction of the black balance increases the deviation in the white balance. An increased deviation causes a greater sense of incongruity in image quality. Thus, with white and black deviated toward different colors before the black balance correction, it is suitable to make the amounts of the offsets smaller. In other words, with white and black deviated toward different colors before the black balance correction as illustrated in FIGS. 11A to 11C, it is suitable to use the amounts of the offsets in FIG. 11C.

In contrast, with white and black deviated toward the same color before the black balance correction, even correction of the black balance does not increase the deviation in the white balance. As a result, even with larger amounts of the offsets, the image has a small sense of incongruity in quality. In other words, with white and black deviated toward the same color before the black balance correction as in FIGS. 12A to 12C, it is suitable to use the amounts of the offsets in FIG. 12B.

In the present exemplary embodiment, in multiplying the input image by the white balance gain and then performing offset addition, the BB offset calculation unit 103 can determine the amounts of the offsets with reference to the amount of deviation in the black balance and the amount of deviation in the white balance. Thus, appropriate amounts of the offsets can be applied based on the deviation in the white balance. As described above, with white and black deviated toward difference colors, the offset amounts can be made small, whereas with white and black deviated toward the same color, the offset amounts can be made large. Consequently, this configuration allows the black balance correction suitable for the white balance.

An image processing apparatus according to a fourth exemplary embodiment of the present disclosure will be described with reference to FIG. 13.

In the present exemplary embodiment, out of intermediate gradations between black and white, a gradation is set as a preferential gradation, and the black balance correction is performed by giving priority to the preferential gradation.

In the present exemplary embodiment, in the configuration in which the input image is subjected to multiplication by the white balance gain and then to offset addition as in the third exemplary embodiment, the amounts of the offsets to correct the black balance are determined based on the amount of deviation in the black balance and the amount of deviation in the white balance. Further, in the present exemplary embodiment, when imaging is performed by taking in the infrared light, the white balance can be intentionally deviated based on the set value.

Figure 13:
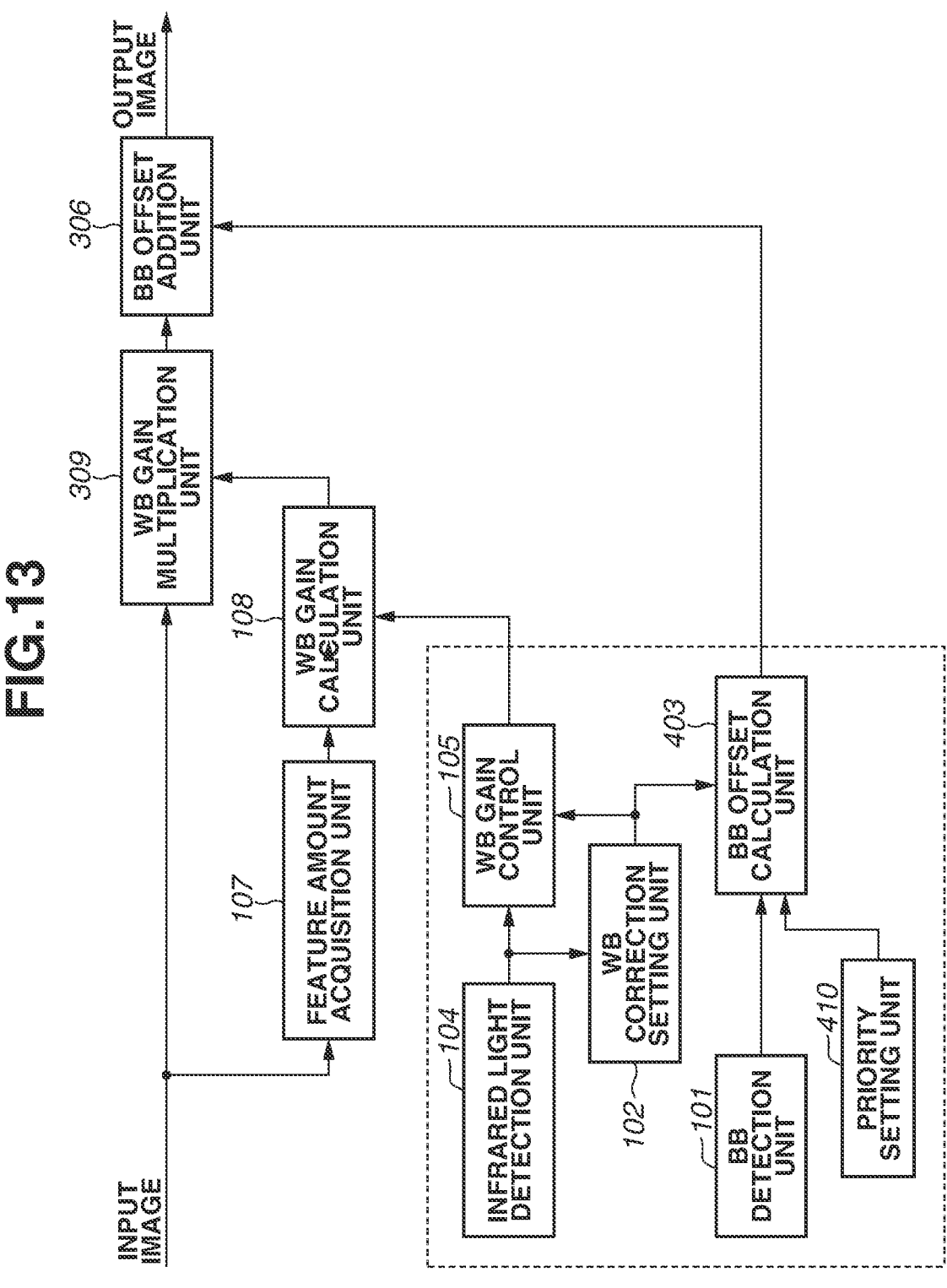
FIG. 13 illustrates an example of a functional configuration of an image processing apparatus according to a fourth exemplary embodiment.

FIG. 13 is a configuration diagram illustrating an example of a functional configuration of the image processing apparatus according to the present exemplary embodiment.

Like numbers in the first exemplary embodiment and the third exemplary embodiment refer to like functional units, and redundant descriptions of the functional units will be omitted.

A BB offset calculation unit 403 acquires the amount of deviation in the black balance from the BB detection unit 101, acquires the amount of deviation in the white balance from the WB correction setting unit 102, and acquires a preferential gradation value from a priority setting unit 410. Further, the BB offset calculation unit 403 calculates the amount of red offset, the amount of green offset, and the amount of blue offset, and outputs the calculated amounts of the offsets to the BB offset addition unit 306.

The priority setting unit 410 sets a gradation of the intermediate gradations between black and white, as a preferential gradation, and outputs the preferential gradation value to the BB offset calculation unit 403.

Figures 14A, 14B, 14C:
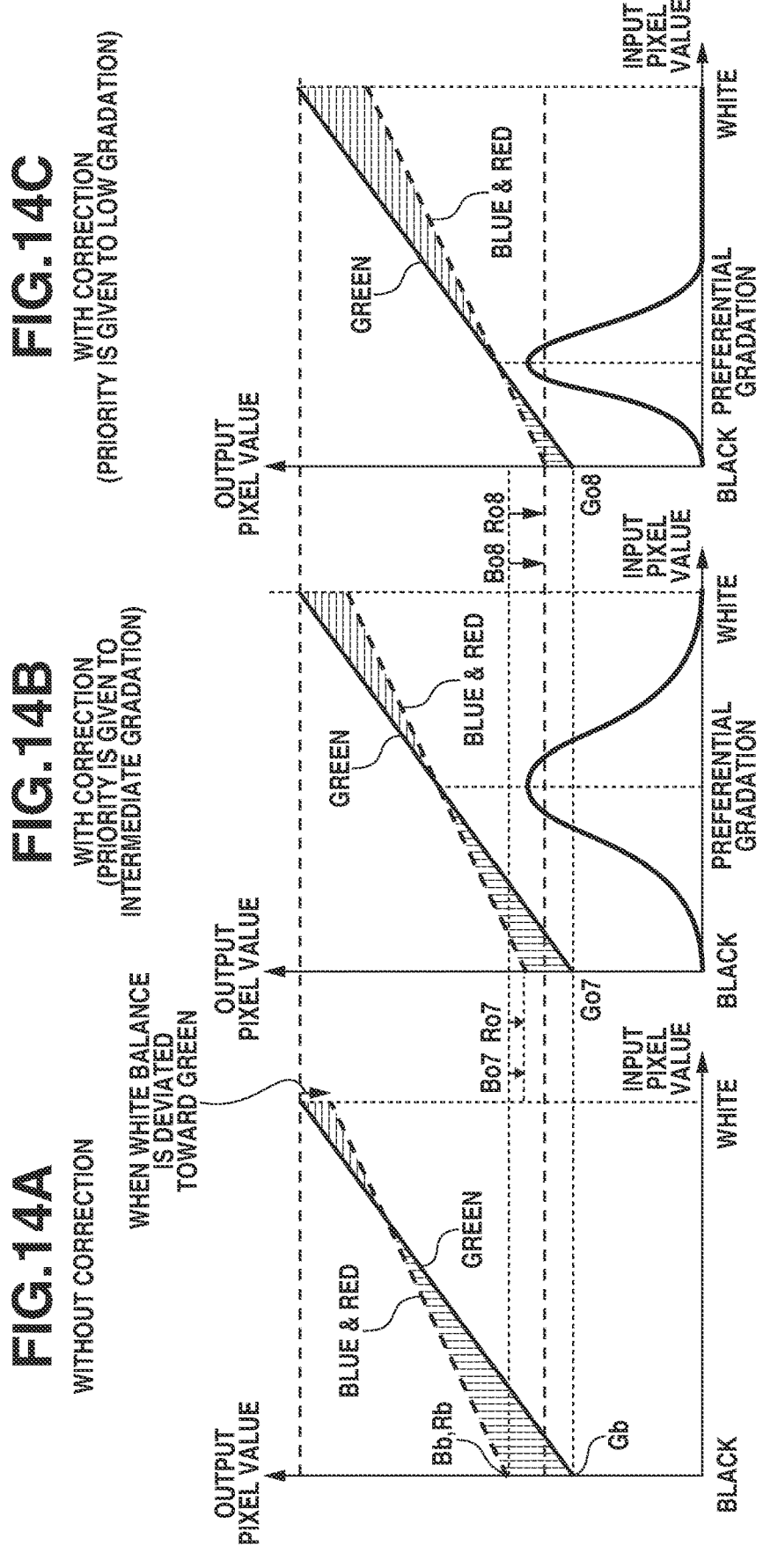
FIGS. 14A to 14C each illustrate an example of black balance control according to the fourth exemplary embodiment.

Operation of the BB offset calculation unit 403 according to the present exemplary embodiment and effects by the present exemplary embodiment will be described with reference to FIGS. 14A to 14C. FIGS. 14A to 14C each illustrate an example of control of black balance correction values (offset values) according to the present exemplary embodiment.

Without correction in FIG. 14A, the blue pixel value and the red pixel value are greater in the black output pixel value than the green pixel value, which indicates that the black balance is deviated toward magenta. Such a phenomenon easily occurs with a larger sensor gain, and the amount of deviation in the black balance is increased as the sensor gain is larger. In contrast, the green pixel value is greater in the white output pixel value than the blue pixel value and the red pixel value, which indicates that the white balance is deviated toward green based on the set value of the WB correction setting unit 102. In other words, the white balance and the black balance are deviated in opposite directions.

In such a case, with the configuration in which the input image is subjected to multiplication by the white balance gain and then to offset addition, as the amounts of the offsets are increased, the deviation in the black balance is reduced, but the deviation in the white balance is increased. In contrast, as the amounts of the offsets are reduced, the deviation in the white balance can be prevented from being increased although the deviation in the black balance cannot be reduced. In other words, the amount of deviation in the black balance and the amount of deviation in the white balance have a trade-off relationship.

In the present exemplary embodiment, the BB offset calculation unit 403 determines the amounts of the offsets by giving priority to the preferential gradation acquired from the priority setting unit 410. More specifically, for example, the BB offset calculation unit 403 determines the amounts of the offsets so as to eliminate the deviation in the white balance in the preferential gradation.

FIG. 14B illustrates a case where a middle gradation between black and white is set as the preferential gradation. In FIG. 14B, the deviation in the black balance is reduced as compared with the case of FIG. 14A, and the white balance is not deviated in the preferential gradation.

FIG. 14C illustrates a case where a gradation lower than the middle gradation in FIG. 14B is set as the preferential gradation. The amounts of the offsets are increased as compared with the case in FIG. 14B.

Although the deviation in the white balance is increased, the deviation in the black balance is reduced as compared with the case of FIG. 14B, and no deviation in the white balance is found in the preferential gradation.

In the present exemplary embodiment, the gradation value is directly set when the priority setting unit 410 sets the preferential gradation; however, the setting method is not limited thereto. The preferential gradation may be set based on, for example, a brightness set value of the imaging apparatus (not illustrated), a set value to shift the exposure of the imaging apparatus to under exposure or over exposure, or a mode of luminance histogram of the input image.

An image processing apparatus according to a fifth exemplary embodiment of the present disclosure will now be described with reference to FIG. 15.

In the present exemplary embodiment, in the configuration in which the input image is subjected to offset addition and then to multiplication by the white balance gain, the amounts of the offsets to correct the black balance are determined based on the amount of deviation in the black balance and the color temperature of a light source in an imaging environment.

Figure 15:
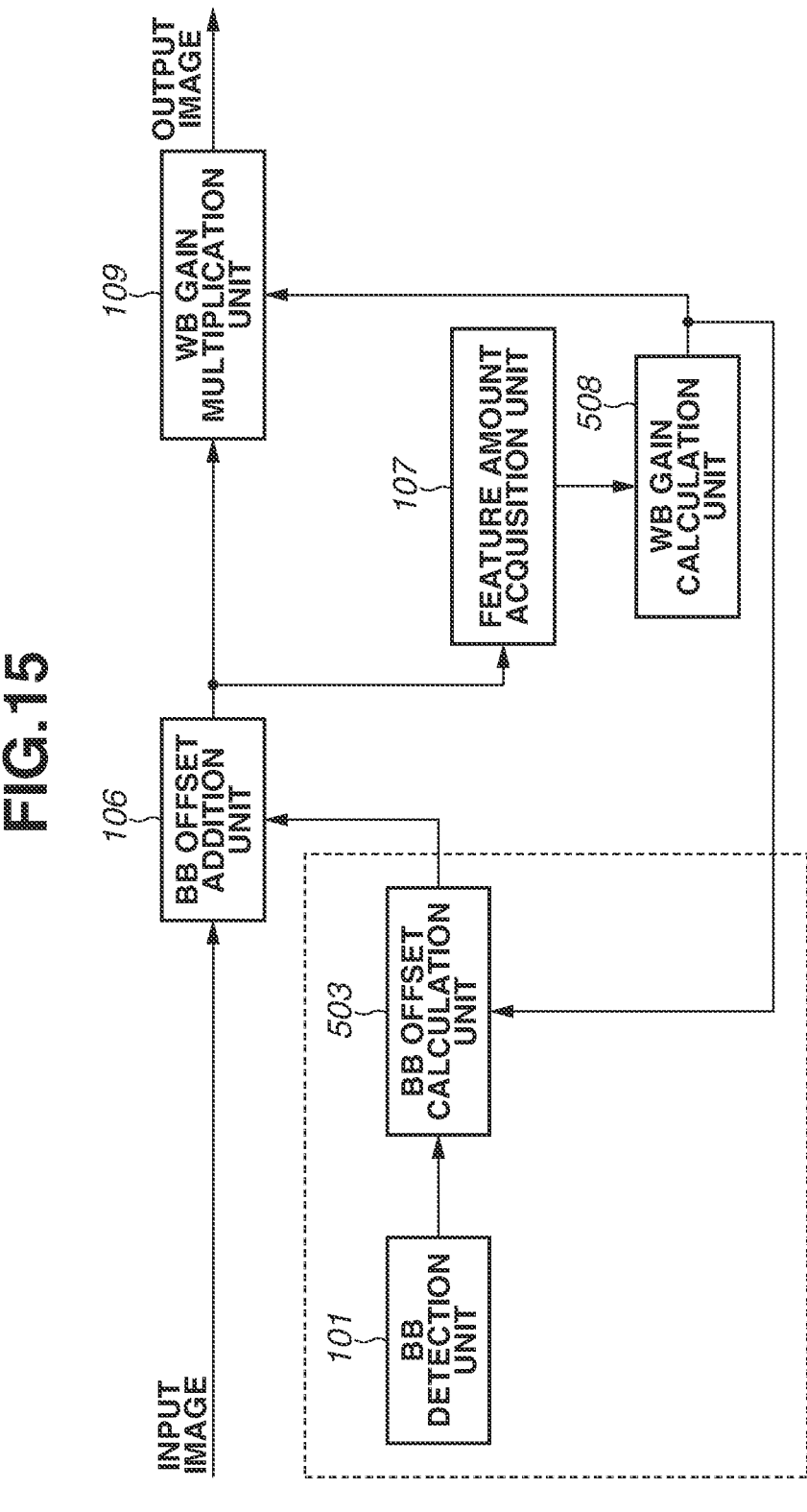
FIG. 15 illustrates an example of a functional configuration of an image processing apparatus according to a fifth exemplary embodiment.

FIG. 15 is a configuration diagram illustrating an example of a functional configuration of the image processing apparatus according to the present exemplary embodiment.

Like number in the first exemplary embodiment refer to like functional units, and redundant descriptions of the functional units will be omitted.

A BB offset calculation unit 503 acquires the amount of deviation in the black balance from the BB detection unit 101, acquires the color temperature of the imaging environment from a WB gain calculation unit 508, calculates the amount of red offset, the amount of green offset, and the amount of blue offset, and outputs the calculated amounts of the offsets to the BB offset addition unit 106.

The amounts of the offsets may be determined with reference to, for example, table data (lookup table (LUT)) associated with the sensor gain (amount of deviation in black balance) and the color temperature of the imaging environment as illustrated in FIG. 16.

The WB gain calculation unit 508 acquires the color information about each area of the image from the feature amount acquisition unit 107, calculates the white balance gain (WB gain), and outputs the white balance gain to the WB gain multiplication unit 109. Further, the WB gain calculation unit 508 calculates the color temperature of the imaging environment from the color information acquired from the feature amount acquisition unit 107 or the calculated WB gain, and outputs the color temperature to the BB offset calculation unit 503. The color temperature may be calculated with reference to previously-created table data indicating a correspondence between the white balance gain and the color temperature, or previously-created table data indicating a correspondence between the color information of the image and the color temperature.

Figure 17:
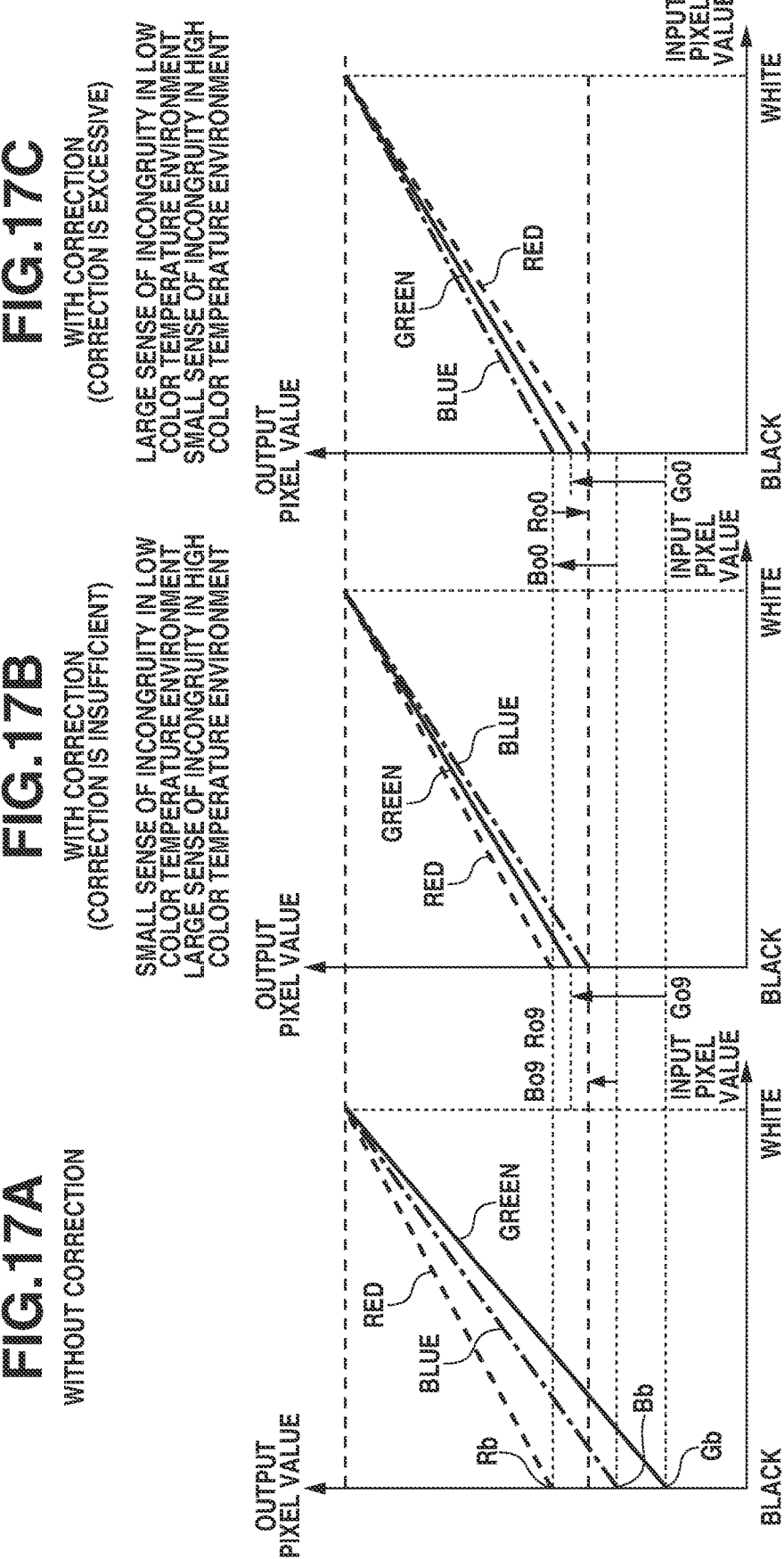
FIGS. 17A to 17C each illustrates an example of black balance control according to the fifth exemplary embodiment.

Effects by the present exemplary embodiment will now be described. FIGS. 17A to 17C each illustrate an example of control of black balance correction values (offset values) according to the present exemplary embodiment.

Graphs in FIGS. 17A to 17C each illustrate characteristics of the pixel values of the input image and the pixel values of the output image when achromatic objects from black to white are captured. The graphs in FIGS. 17A to 17C each illustrate characteristics of the red, green, and blue pixel values.

Without correction in FIG. 17A, the blue pixel value and the red pixel value are greater than the green pixel value, and the red pixel value is greater than the blue pixel value in the black output pixel value, which indicates that the black balance is deviated toward red to magenta. Such a phenom-enon easily occurs with a larger sensor gain, and the amount of deviation in the black balance is increased as the sensor gain is larger.

In FIG. 17B, the red pixel value is greater than the green pixel value, and the blue pixel value is smaller than the green pixel value in the black output pixel value. Thus, the black balance is deviated toward umber. In other words, the black balance is deviated to a color close to the illumination color at low color temperature. With a low color temperature of the illumination in the imaging environment, a small sense of incongruity is felt even when the black balance is deviated toward the low color temperature. In contrast, with a high color temperature of the illumination in the imaging environment, and with the black balance deviated toward the low color temperature, a large sense of incongruity is felt.

In FIG. 17C, the amounts of the offsets are large as compared with the case of FIG. 17B. Further, in FIG. 17C, the blue pixel value is greater than the green pixel value, and the red pixel value is smaller than the green pixel value in the black output pixel value. Thus, the black balance is deviated toward blue to cyan. In other words, the black balance is deviated to a color close to the illumination color at high color temperature. With a high color temperature of the illumination in the imaging environment, a small sense of incongruity is felt even when the black balance is deviated toward the high color temperature. In contrast, with a low color temperature of the illumination in the imaging environment, and with the black balance deviated toward the high color temperature, a large sense of incongruity is felt.

As described above, with the black balance deviated toward red to magenta, and with a low color temperature of the illumination in the imaging environment, it is suitable that the amounts of the offsets are relatively small as in FIG. 17B. In contrast, with the black balance deviated toward red to magenta, and with a high color temperature of the illumination in the imaging environment, it is suitable that the amounts of the offsets are relatively large as in FIG. 17C.

Further, with the black balance deviated toward cyan to blue, the amounts of the offsets are reversed. In other words, with the black balance deviated toward cyan to blue, and with a low color temperature of the illumination in the imaging environment, it is suitable that the amounts of the offset are relatively large as in FIG. 17C. In contrast, with the black balance deviated toward cyan to blue, and with a high color temperature of the illumination in the imaging environment, it is suitable that the amounts of the offsets are relatively small as in FIG. 17B.

In the present exemplary embodiment, the WB gain calculation unit 508 and the WB gain multiplication unit 109 may control the white balance based on deviation in the black balance detected by the BB detection unit 101. For example, the white balance is controlled based on the offset values for the black balance. This control facilitates maintenance of tones of the object after the middle luminance with the offset values for the black balance according to the user's intention.

Although the exemplary embodiments of the present disclosure have been described above, the present disclosure is not limited to these exemplary embodiments, and various modifications and changes can be made within the gist of the present disclosure.

Figure 18:
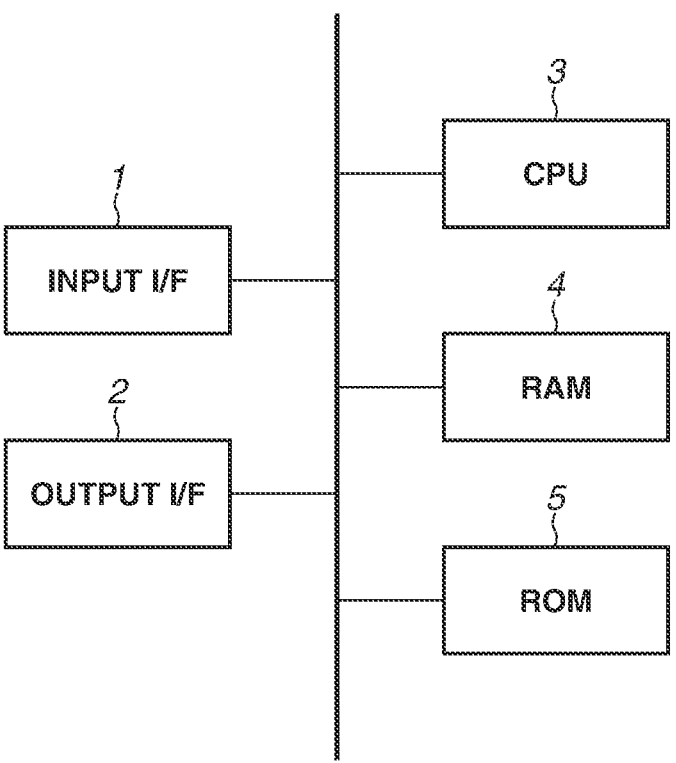
FIG. 18 illustrates an example of a hardware configuration of the image processing apparatus according to some embodiments.

FIG. 18 illustrates an example of a hardware configuration of the image processing apparatus according to each of the exemplary embodiments of the present disclosure. The image processing apparatus includes an input interface (I/F) 1, an output I/F 2, a central processing unit (CPU) 3, and a random access memory (RAM) 4, and a read only memory

15

(ROM) 5. The CPU 3 includes one or more processors, circuitry, or combinations thereof. The input I/F 1 is an interface receiving input images. One or more functions of the above-described exemplary embodiments are achieved by the CPU 3 loading programs stored in the ROM 5 to the RAM 4 and running the programs. The output I/F 2 is an interface outputting images obtained by performing the above-described image processing on the input images. As used herein, the term "unit" generally refers to any combination of hardware, firmware, software, or other component that is used to effectuate a purpose.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-042912, filed Mar. 17, 2022, which is hereby incorporated by reference herein in its entirety.

What is claimed is:

1. An image processing apparatus comprising:
at least one processor; and
a memory coupled to the at least one processor and storing instructions that, when executed by the processor, cause the processor and storing to function as:
a detection unit configured to detect deviation in black balance in an input image;
an acquisition unit configured to acquire information on white balance of the input image;
a determination unit configured to determine whether an infrared cut-off filter is inserted in an optical axis of an imaging unit capturing the input image;

a calculation unit configured to calculate, in a case where the detection unit detects the deviation in the black balance in a state where the determination unit determines that the infrared cut-off filter is not inserted in the optical axis, a correction value to correct the deviation in the black balance by using the information on the white balance and the deviation in black balance; and
a correction unit configured to correct the deviation in the black balance based on the correction value calculated by the calculation unit,
wherein the calculation unit determines the correction value with reference to a table data associated with the information on the white balance and the deviation in black balance.

2. The image processing apparatus according to claim 1, wherein the information on the white balance is information on deviation in the white balance.

3. The image processing apparatus according to claim 1,
wherein the acquisition unit acquires information on an imaging environment of the input image, and
wherein, in the case where the detection unit detects the deviation in the black balance, the calculation unit calculates the correction value based on the information on the imaging environment.

4. The image processing apparatus according to claim 3, wherein the information on the imaging environment is a color temperature of a light source in the imaging environment.

5. The image processing apparatus according to claim 3, wherein the information on the imaging environment is a quantity of infrared light in the imaging environment.

6. The image processing apparatus according to claim 1, further comprising a control unit configured to control to shift the white balance of the input image based on the information on the white balance.

7. The image processing apparatus according to claim 6, wherein the control unit controls the white balance based on the deviation in the black balance detected by the detection unit.

8. The image processing apparatus according to claim 1, wherein the detection unit detects the deviation in the black balance by detecting at least one of a sensor gain in the input image, a shutter speed, a temperature, an operation time of an imaging apparatus, and a light quantity of infrared light in an imaging environment.

9. The image processing apparatus according to claim 8, wherein the detection unit detects the deviation in the black balance as the sensor gain in the input image is larger, as the shutter speed is higher, as the temperature is higher, as the operation time of the imaging apparatus is longer, or as the light quantity of infrared light in the imaging environment is larger.

10. The image processing apparatus according to claim 1, wherein the table data includes offset values of RGB colors to correct the black balance.

11. The image processing apparatus according to claim 1, wherein the deviation in black balance is a value of a gain to be multiplied to an output signal of an imaging sensor.

12. The image processing apparatus according to claim 1, wherein the information on the white balance is represented by such an integer value that an amount of deviation toward magenta is increased as the integer value is smaller, whereas an amount of deviation toward green is increased as the integer value is larger.

13. An image processing method, comprising:
detecting deviation in black balance in an input image;

acquiring information on white balance of the input image;

determining whether an infrared cut-off filter is inserted in an optical axis of an imaging unit capturing the input image;

calculating, in a case where the deviation in the black balance is detected in a state where the infrared cut-off filter is not inserted in the optical axis, a correction value to correct the deviation in the black balance by using the information on the white balance and the deviation in black balance; and correcting the deviation in the black balance based on the calculated correction value, wherein the calculating determines the correction value with reference to a table data associated with the information on the white balance and the deviation in black balance.

14. The image processing method according to claim 13, further comprising acquiring information on an imaging environment of the input image, wherein, in the case where the deviation in the black balance is detected, the correction value is calculated based on the information on the imaging environment.

15. A non-transitory computer-readable storage medium storing a program for causing a computer to execute an image processing method comprising:

detecting deviation in black balance in an input image;

acquiring information on white balance of the input image;

determining whether an infrared cut-off filter is inserted in an optical axis of an imaging unit capturing the input image;

calculating, in a case where deviation in the black balance is detected in a state where the infrared cut-off filter is not inserted in the optical axis, a correction value to correct the deviation in the black balance by using the information on the white balance and the deviation in black balance; and correcting the deviation in the black balance based on the calculated correction value, wherein the calculating determines the correction value with reference to a table data associated with the information on the white balance and the deviation in black balance.

* * * * *